Patented Mar. 14, 1944

2,344,001

UNITED STATES PATENT OFFICE 2,344,001

PROCESS FOR THE PRODUCTION OF ALKALI METAL SULPHIDES

Richard S. Robinson, Geddes, N. Y., assignor to The Solvay Process Company, New York, N. Y., a corporation of New York No Drawing. Application October 30, 1942, Serial No. 463,993

12 Claims. (Cl. 23—134)

This invention relates to the production of alkali metal sulphides, more particularly to the production of alkali metal sulphides of high purity.

As is well known, alkali metal sulphides have found a variety of uses, particularly in the fields of photography and tanning. Such sulphides may be prepared in substantially pure form by reacting a solution of an alkali metal hydroxide with hydrogen sulphide or by reducing an alkali metal polysulfide solution with an alkali metal amalgam. However, these procedures are somewhat disadvantageous to operate. The first procedure, because of the well known noxious and corrosive properties of the hydrogen sulphide reactant, requires special precautions to prevent escape of this gas into the atmosphere. The second procedure not only requires the employment of the comparatively expensive amalgam, but necessitates great care to insure that the alkali metal contained in the amalgam is not depleted to a point that mercury sulphides rather than alkali metal sulphides result. Because of these and other disadvantages, neither of the above processes is completely satisfactory for the production of alkali metal sulphides of high purity.

It is an object of this invention to provide an improved process for the production of alkali metal sulphides.

It is a more specific object of this invention to provide an improved process for the production of alkali metal sulphides of high purity.

In accordance with this invention substantially pure alkali metal sulphides are obtained by reaction of sulphur with an aryl hydrazo compound and a compound having the type formula Alk—OR in which Alk denotes an alkali metal and R denotes a radical selected from the group consisting of hydrogen and alkyl groups, the alkyl groups preferably containing not more than 4 carbon atoms. In addition to the desired sulphide the process of my invention yields another valuable compound in the form of the aryl azo compound corresponding to the aryl hydrazo compound employed in the reaction; water or an alcohol are the other products of the reaction, depending upon whether R in the above formula represents hydrogen or an alkyl group. If it is desired to produce substantially anhydrous alkali metal sulphides in accordance with my invention, a compound of the type formula Alk—OR in which R is an alkyl group preferably containing not more than 4 carbon atoms should be employed so that the anhydrous sulphide and an alcohol are obtained; on the other hand, if an aqueous sulphide product is desired, a compound of the type formula Alk—OR in which R is hydrogen should be employed so that water is produced during the reaction. Preferably, the reaction is carried out in the presence of a solvent for aryl hydrazo compounds and in which the alkali metal sulphides have a low solubility; aromatic hydrocarbon solvents such as benzene and toluene are eminently suitable for this purpose since by carrying out the reaction in their presence the alkali metal sulphides separate from the solution of the aryl azo compound produced and may thus be easily recovered. It will be evident, therefore, my invention not only provides a simple and effective process for the production of valuable inorganic sulphides but also enables a valuable by-product, namely aryl azo compounds, to be obtained, thus contributing to the over-all economy of the process.

It is to be undersood the term "aryl hydrazo compound" is employed throughout the specification and claims to denote compounds containing the hydrazo grouping (—NH—NH—) in which an aryl nucleus is attached to each nitrogen atom, and that the term "aryl azo compound" is used to denote compounds in which an aryl nucleus is attached to each of the nitrogen atoms of an azo group (—N=N—).

In carrying out the process of my invention sulphur, an aryl hydrazo compound and a compound having the type formula Alk—OR may be mixed and the mixture then agitated until the desired reaction has been effected. The sulphur may be incorporated in the reaction mixture in the form of solid sulphur or solutions thereof in solvents such as benzene or xylene, but preferably such sulphur is supplied in the form of an alkali metal polysulphide solution containing, for example, between about 1% and about 40% free sulphur (expressed as elemental sulphur). The aryl hydrazo compound employed may be hydrazobenzene, hydrazotoluene, or any other suitable aryl hydrazo compound substituted or unsubstituted in one or both of the nuclei. As hereinabove pointed out, if anhydrous sulphides are desired, a compound having the type formula Alk—OR in which R is an alkyl group containing not more than 4 carbon atoms should preferably be used, such as sodium or potassium methylate, ethylate, propylates or butylates. On the other hand, if an aqueous sulphide product is desired, a compound having the type formula Alk—OR in which R is hydrogen should be used, such as sodium or potassium hydroxide. It is to be understood, of course, that mixtures of alkali metal hydroxides and alcoholates may be employed, the proportion of hydroxide being adjusted in accordance with the amount of water desired in the final product. The proportion of the reacting ingredients should be in the neighborhood of one mol of the aryl hydrazo compound and two mols of the Alk—OR substance per mol of elemental sulphur. The temperature at which the reaction is carried out may be between about 20° C. and about the boiling point of the solvent employed. The reaction is preferably conducted out of contact with air to prevent loss of sulphide product due to undesirable side reactions thereof with air.

A preferred embodiment of my invention may be practiced by dissolving hydrazobenzene in a solvent therefor such as benzene, toluene or other aromatic hydrocarbon solvent to form a solution containing between about 5% and about 25% by weight of hydrazobenzene and then adding to the solution an aqueous solution containing between about 1% and about 25% by weight of an alkali metal polysulphide having a free sulphur content of from about 1% to about 60% by weight (expressed as elemental sulphur on a dry basis) and between about 1% and about 25% by weight of an alkali metal hydroxide. The addition of a small amount of an alcohol such as ethyl alcohol, I have found, reduces the reaction time and accordingly an amount of an alcohol equivalent to between about 5% and about 10% of the weight of the water present in the mixture is preferably added to the reactants. The mass is then agitated out of contact with air until reaction has been completed, the time required being between about five and about fifteen minutes. At the end of this time the aqueous layer containing the alkali metal sulphide dissolved therein is separated from the organic solvent layer containing the azobenzene, and the alkali metal sulphide may then, if desired, be recovered in any suitable manner, for example by evaporating the water. The azobenzene produced may be subsequently reduced to hydrazobenzene and the latter compound then re-employed for the manufacture of further quantities of sulphide in accordance with this invention.

If anhydrous alkali metal sulphides are to be produced, an alcoholic solution of the polysulphide should be added to the solution of hydrazobenzene in the aromatic hydrocarbon solvent and an alkali metal alcoholate such as sodium methylate or ethylate employed in place of the alkali metal hydroxide. In this instance an alcoholic solution of the anhydrous alkali metal sulphide product separates from the solution of the azobenzene in the aromatic hydrocarbon solvent, from which the sulphide may be recovered.

The following examples are illustrative of my invention. Amounts are given in parts by weight.

*Example 1.*—700 parts of an aqueous solution containing 5.5% sodium sulphide, 4.5% free sulphur (present as polysulphide) and 15% sodium hydroxide were mixed with a solution of 184 parts of hydrazobenzene dissolved in 1,000 parts of benzene. 50 parts of methyl alcohol were then added to the mixture and the resulting mixture agitated out of contact with air for ten minutes. A the end of this time agitation was discontinued and the reaction mixture permitted to stand for a few minutes, whereupon two liquid layers formed, the upper layer being a solution of azobenzene in benzene, and the lower layer being a solution of substantially pure sodium sulfide in water. These layers were separated and the sulphide and azobenzene recovered.

*Example 2.*—A slurry of 32 parts of sulphur, 108 parts of sodium methylate and 201 parts of anhydrous methanol were mixed with a solution of 184 parts of hydrazobenzene in 1,000 parts of benzene and the mixture agitated out of contact with air for ten minutes. At the end of this time agitation was discontinued and the reaction mixture permitted to stand, whereupon two liquid layers formed, the lower layer comprising an alcoholic solution of substantially pure anhydrous sodium sulfide; this layer was separated from the solution of azobenzene in benzene and the sodium sulphide recovered.

It will be evident from the above description that the process of my invention provides a simple and effective method for producing alkali metal sulphides of high purity. In view thereof it will be of great interest to those engaged in the manufacture of such products.

Since certain changes may be made in carrying out the above process without departing from the scope of the invention, it is intended that all matter contained in the above description shall be interpreted as illustrative and not in a limiting sense.

I claim:

1. A process for the production of an alkali metal sulphide which comprises reacting sulphur with an aryl hydrazo compound and a compound having the type formula Alk—OR, wherein Alk represents an alkali metal and R denotes a radical selected from the group consisting of hydrogen and alkyl groups.

2. A process for the production of an alkali metal sulphide which comprises reacting sulphur with an aryl hydrazo compound and a compound having the type formula Alk—OR, wherein Alk represents an alkali metal and R denotes a hydrogen atom.

3. A process for the production of an anhydrous alkali metal sulphide which comprises reacting sulphur with an aryl hydrazo compound and a compound having the type formula Alk—OR, wherein Alk represents an alkali metal and R denotes an alkyl group containing not more than 4 carbon atoms.

4. A process for the production of a substantially pure alkali metal sulphide which comprises reacting sulphur with an aryl hydrazo compound and a compound having the type formula Alk—OR, wherein Alk represents an alkali metal and R denotes a radical selected from the group consisting of hydrogen and alkyl groups containing not more than 4 carbon atoms, in the presence of a solvent in which the aryl hydrazo compound is readily soluble and the alkali metal sulphide product sparingly soluble.

5. A process for the production of a substantially pure alkali metal sulphide which comprises reacting sulphur with an aryl hydrazo compound and a compound having the type formula Alk—OR, wherein Alk represents an alkali metal and R denotes a radical selected from the group consisting of hydrogen and alkyl groups containing not more than 4 carbon atoms, in the presence of an aromatic hydrocarbon solvent.

6. A process for the production of a substantially pure alkali metal sulphide which comprises adding to a solution of an aryl hydrazo compound in an aromatic hydrocarbon solvent an alkali metal polysulphide containing between about 1% and about 60% free sulphur (expressed as elemental sulphur on a dry basis) and a compound having the type formula Alk—OR, wherein Alk represents an alkali metal and R denotes a radical selected from the group consisting of hydrogen and alkyl groups containing not more than 4 carbon atoms, agitating the mixture out of contact with air, and separating the sulphide from the solution of the aryl azo compound corresponding to the aryl hydrazo compound employed in the aromatic hydrocarbon solvent.

7. A process for the production of a substantially pure alkali metal sulphide which comprises adding to a solution of an aryl hydrazo compound in an aromatic hydrocarbon solvent an aqueous alkali metal polysulfide containing between about 1% and about 60% free sulphur (expressed as elemental sulphur on a dry basis) and an alkali metal hydroxide, agitating the mixture out of contact with air, and separating an aqueous solution of the sulphide from the solution of the aryl azo compound corresponding to the aryl hydrazo compound employed in the aromatic hydrocarbon solvent.

8. A process for the production of a substantially pure anhydrous alkali metal sulphide which comprises adding to a solution of an aryl hydrazo compound in an aromatic hydrocarbon solvent an alcoholic solution of an alkali metal polysulphide containing between about 1% and about 60% free sulphur (expressed as elemental sulphur on a dry basis) and an alkali metal alcoholate, agitating the mixture out of contact with air, and separating the sulphide from the solution of the aryl azo compound corresponding to the aryl hydrazo compound employed in the aromatic hydrocarbon solvent.

9. A process for the production of a substantially pure alkali metal sulphide which comprises adding to a solution of hydrazobenzene in an aromatic hydrocarbon solvent an aqueous alkali metal polysulphide containing between about 1% and about 60% free sulphur (expressed as elemental sulphur on a dry basis) and an alkali metal hydroxide, incorporating a small amount of an alcohol in the mixture, agitating the mixture out of contact with air, and separating an aqueous solution of the sulphide from the solution of azobenzene in the aromatic hydrocarbon solvent.

10. A process for the production of a substantially pure alkali metal sulphide which comprises adding to a solution of hydrazobenzene in an aromatic hydrocarbon solvent an alcoholic alkali metal polysulphide containing between about 1% and about 60% free sulphur (expressed as elemental sulphur on a dry basis) and an alkali metal alcoholate, agitating the mixture out of contact with air, and separating an alcoholic solution of the sulphide from the solution of azobenzene in the aromatic hydrocarbon solvent.

11. A process for the production of substantially pure sodium sulphide which comprises adding to a solution of hydrazobenzene in benzene an aqueous sodium polysulphide containing between about 1% and 60% free sulphur (expressed as elemental sulphur on a dry basis) and sodium hydroxide, adding a small amount of an alcohol to the mixture, agitating the mixture out of contact with air and separating an aqueous solution of sodium sulphide from the solution of azobenzene in benzene.

12. A process for the production of substantially pure anhydrous sodium sulphide, which comprises adding to a solution of hydrazobenzene in benzene an alcoholic sodium polysulphide containing between about 1% and about 60% free sulphur (expressed as elemental sulphur on a dry basis) and sodium methylate, agitating the mixture out of contact with air and separating an alcoholic solution of the sulphide from the solution of azobenzene in benzene.

RICHARD S. ROBINSON.